Sept. 29, 1953     W. A. SUTHERLAND     2,653,400
TAMPERPROOF IDENTIFICATION TAG
Filed Aug. 8, 1949     2 Sheets-Sheet 1

INVENTOR.
William Alfred Sutherland
BY
Alman S. Nelson

Sept. 29, 1953  W. A. SUTHERLAND  2,653,400
TAMPERPROOF IDENTIFICATION TAG

Filed Aug. 8, 1949  2 Sheets-Sheet 2

INVENTOR.
William Alfred Sutherland
BY
Almon S. Nelson

Patented Sept. 29, 1953

2,653,400

UNITED STATES PATENT OFFICE 2,653,400

TAMPERPROOF IDENTIFICATION TAG

William Alfred Sutherland, Essex Junction, Vt.

Application August 8, 1949, Serial No. 109,150

3 Claims. (Cl. 40—3)

This invention relates to a tamper-proof tag particularly adapted for use in tagging ears of cattle and other live-stock but also useful wherever and whenever a tamper-proof identification tag or the like is necessary, advisable or desirable.

The primary object of the invention is to provide a tamper-proof means for ear-tagging live stock.

Other objects of the invention are to provide an identification tag that will:

Provide a positive and fool-proof identification tag.

Prevent the use of any tool or means for removing said tag without destroying it or making it useless.

Prevent the investing of inferior live-stock with the identity and/or merits of previously selected or rated superior animals.

Prevent the switching of ear-tags without their complete destruction, and/or their obvious mutilation.

Prevent tampering with ear-tags originally attached or switching them or removing them without the full knowledge of all interested parties.

Assure correct information thru fool-proof ear-tags to those engaged in artificial insemination.

Provide an identification or ear-tag that locks itself closed, in a concealed compartment integral to or separable from the strip passing thru the ear of a cow, for example.

Provide an ear-tag for live-stock in which the locking means is completely concealed and wholly unadaptable for re-use and thus wholly tamper-proof.

All of the above objects and advantages of the invention will become apparent as the description proceeds, first in a general statement and thence by reference being made to the accompanying drawings forming a part of the present disclosure, wherein:

In general, the invention is a tamper-proof ear-tag for live stock, particularly for cattle but not limited thereto, comprising a length of suitable material of sufficient and proper cross-section to constitute a link-like appearance when placed through a cow's ear, for instance, one end being tapered to a relatively sharp point with a rectangular or suitably-shaped slot at a proper distance from that point and adapted to receive the tip of said pointed section when curved upon itself from said hole to the end of such point, the other end adapted to receive two cover ends after being shaped into a cylinder. A suitably grooved interior is provided, thus forming a sealed cylindrically shaped compartment or member without an opening except for a slot pre-punched or otherwise formed in that end of the prospective open link and at such place and of such size as to admit the aforesaid pointed end of said open link to such extent that said point, under pressure, is forced into said slot in such compartment and further forced to curl along the interior wall of said compartment and thru a path directing said point into the slot adjacent to it and thus curling said pointed end of the finished open link into a permanently locked and concealed position within the aforesaid sealed compartment.

Also, in general, the sealed compartment above mentioned, may be a separable unit as shown in Figs. 12 and 13 with a slot in its side adapted to co-act with one end of an open link, having a similar slot thru which the pointed end of the finished link is threaded or directed in applying the identification or ear-tag. In this form of the invention, the separable compartment is a separable rather than an integral keeper, as in the above paragraph, and thus provides a tamper-proof ear-tag for live-stock or like situations.

Also, in general, the ends of the sealed compartment, whether cylindrical or otherwise in shape, may be attached by welding, brazing, soldering or any other means suitable to the creation of a sealed capsule-like structure with but one opening and that only for the reception of the locking end of the finished link which, when applied, becomes a permanent ear-tag or identification means.

In particular, referring to the drawings attached hereto and made a part hereof, a preferred form of the disclosure of the invention is shown in Figures 1 to 7 inclusive with modifications illustrated in Figures 8 to 18 inclusive.

Figure 1:
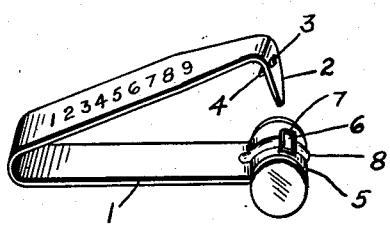
Fig. 1 is a perspective view of the preferred embodiment of the invention in its open state ready for application and carrying illustrative identification numbers or marks.
Figure 2:
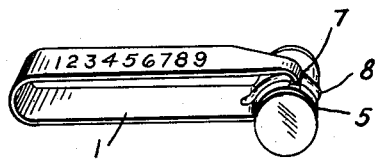
Fig. 2 is a perspective view of Fig. 1 in its closed position after application as an ear-tag or an identification tag.
Figure 3:
Fig. 3 is a perspective view of Figure 1 before forming, except for ends or closures to sealed chamber.

Referring to the drawings and particularly Fig. 3, 1 indicates a tag made up of strip material, preferably metal, formed with a pointed end 2, with a suitable slot 3, and an inwardly placed sill or ledge 4. At the other end of this strip material is a slot 6, with a swedged or otherwise formed lip 7 there around. A groove 8 extends from either side of the slot 6 depending outwardly or downwardly and the strip is reduced in width to provide the portion 9. When this blank is formed into the shape shown in Figure 1, end-plates 10 are securely fastened to the sleeve-like end 5 of Fig. 1 thus forming a sealed chamber except for slot 6 therein. The end of the sharp end 2 on forming into Fig. 1 is slightly inwardly bent so that it will train itself under pressure around the groove 8 in the interior of sealed member 5.

Figure 5:
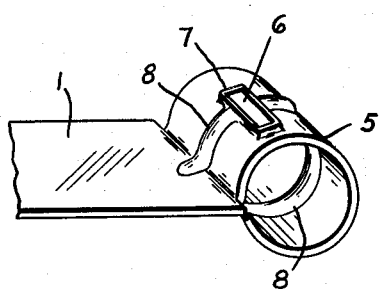
Fig. 5 is a perspective view of the open chamber showing a groove in relation to the opening for the sharp end of the tag.
Figures 4, 8:
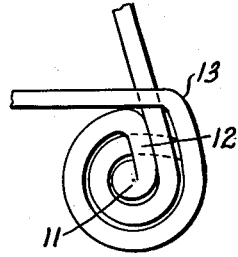
Fig. 4 is a perspective view of each end plate used for completing sealed chamber in Fig. 1.
Fig. 8 is a side elevation of a modification of the sealed chamber, showing one side of said chamber turned inwardly so that a perforated fin with a rolled tip or edge provides a locking hole in such fin in addition to the locking hole in the sharp-end of the tag.
Figures 6, 7:
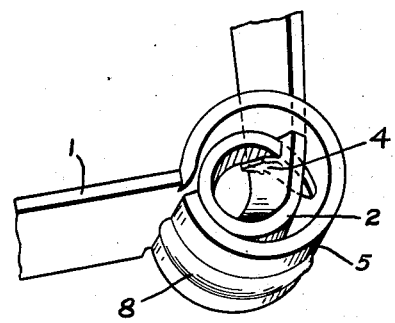
Fig. 6 is a plan view of Fig. 5 showing positioning of the end plates with which to seal the chamber of Fig. 5 except for opening 6.
Fig. 7 is a perspective view showing manner in which the sharp end, after use of pressure, curls itself within the sealed chamber and inserts itself in its contained slot thus forming a permanently tight lock—this shows the ends of tag securely locked together.
Figure 9:
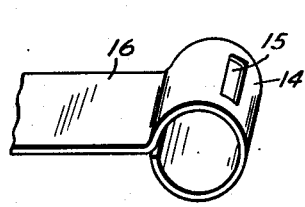
Fig. 9 is a perspective view of a modification of the blunt end of a tag.

In Fig. 9 a simple form of a sealed chamber is illustrated wherein the blunt end 16 of the tag is provided with a cylindrical portion 14 having a slot 15. This form of the invention is similar to that shown in Fig. 5 except there is no interior groove such as the groove 8 in Fig. 5 and there is no shoulder 7 surrounding the slot as in Fig. 5. This type is of course less expensive than that shown in Fig. 5.

Figure 10:
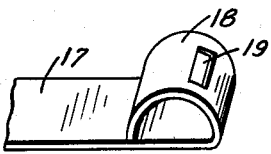
Fig. 10 is another modification of the blunt end.

In Fig. 10 the sealed chamber is shown in the form of a half-circle. In this case the blunt end 17 is reversely bent upon itself to provide the portion 18 which is semi-circular in cross-section and is provided with the slot 19.

Figure 11:
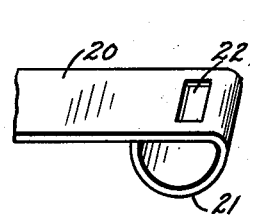
Fig. 11 is a further modification of the blunt end.

In Fig. 11 the parts are reversed and the slot 22 is placed in the blunt end 20 rather than in the semi-circular portion 21.

Figure 12:
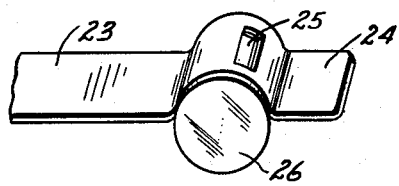
Fig. 12 is a perspective view showing a separate sealed chamber prior to final assembly.
Figure 13:
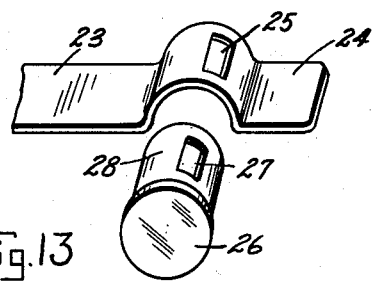
Fig. 13 is an exploded view of the device shown in Fig. 12.

In Figs. 12 and 13 a separate sealed chamber 28 is employed. This chamber has ends 26, only one of which is shown, and it is provided with the slot 27 which is adapted to coincide with the slot 25. After the parts are placed in the position shown in Fig. 12, the outer end 24 is then bent around the cylinder 28 and the parts are secured by spot welding or any other appropriate means.

Figure 14:
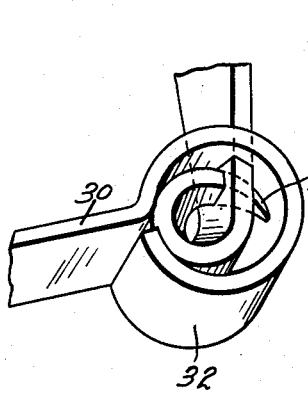
Fig. 14 is a perspective view of a modification of the sealed chamber.

In Fig. 14 the pointed end 31 is shown after it has entered the slot in the cylinder 32 which lies at the extremity of the blunt end 30. It is to be understood that the pointed end first passes through the slot in the cylinder 32 and then curves around the interior surface of such cylinder and enters a second slot in the pointed end as illustrated.

Figure 15:
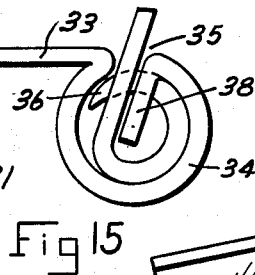
Fig. 15 is a side elevation of a modification of the sealed chamber with the ends removed.

In Fig. 15 the sealed chamber is formed by first bending the end 38 of the blunt portion 33 to form a flange or lip. The blunt end is then bent to provide a circular portion 34 or more accurately defined as an incomplete circular portion since a space 35 is left after the reception of the pointed end 36. In this case, as in the previous instances, the pointed end 36 passes through two slots and is securely locked. It is to be noted that the expense of forming a slot is avoided in this modification, and it is also to be understood that ends such as 18 or 26 may be welded or otherwise secured. These are not being shown.

Figure 16:
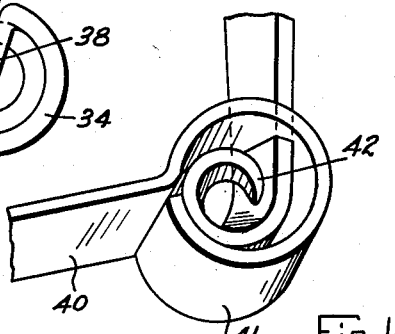
Fig. 16 is a perspective view of a modification of the pointed end.

In Fig. 16 the blunt end 40 is provided with a cylindrical chamber 41, this modification differing from the preceding in that the pointed end 42 passes through one slot as distinguished from the previous embodiments wherein the pointed end passed through two slots. This construction is of course weaker than the other constructions.

Figure 17:
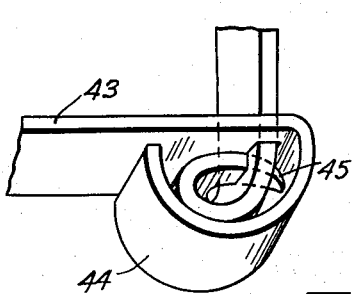
Fig. 17 is a perspective view of a modified form of the sealed chamber.
Figure 18:
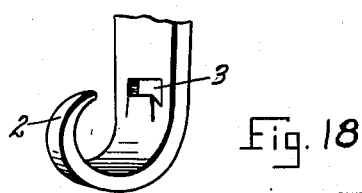
Fig. 18 is a perspective view of the pointed end.

In Fig. 17 the pointed end 45 is shown as being received within the semi-circular portion 44 of the blunt end 43. Here the slot is provided in the flat portion of the blunt end rather than in the semi-circular portion as shown in Fig. 10.

It is obvious that other modifications may occur to those skilled in the art and it is my desire not only to cover the specific embodiment and the variations or modifications illustrated and described herein but also to cover all such modifications that come within the scope of the appended claims.

I claim:

1. In an ear-tag of the character described, a tamper-proof tag comprising a suitable material of sufficient length, width and thickness to form, when bent upon itself, an open link-like shape with one end of said open link shaped to a pointed end depending slightly towards the other end of said open link, the pointed end being slightly curved toward the other end and containing a slot with a transversely directed sill, the other end having a sealed compartment with an inner surface and being equipped with a slot on its side and an outward groove therearound, thru which said pointed end may be forcibly inserted such as to direct said point by means of the inner surface around the interior wall of said sealed member so that the point first passes thru the second named slot and thence thru the slot in itself in such relative manner as to cause the pointed end to securely lock itself in position within the sealed chamber to form a permanently closed link-like article for use as a tamper-proof identification tag.

2. In a tag of the character described, a tamper-proof fastening device consisting of a sealed member secured to a blunt end of a link-like tagging means, such sealed member and blunt end of the link-like member being slotted, an inwardly directed pointed end of such link-like member being slotted, said pointed end threading itself through the slots of the sealed member and the blunt end and curving itself along the inner surface of said sealed member and then inserting its inwardly curved relatively sharp end into a slot adjacent to such pointed sharp end, thus providing a fastener that cannot be removed without obvious tampering.

3. In an ear tag formed of two parts, an integrally formed chamber at the end of one of said parts with two covers permanently fastened thereto, such as to form a sealed member, said member having a slot, the other part having a pointed end with a slot, the inner side of said closed chamber presenting to said pointed end of the other part a grooved interior whereby upon forcibly inserting said pointed end in said first-named slot the same is rolled about said interior and then caused to enter said second-named slot in and adjacent to said pointed-end to form a tight tamper-proof identification tag.

WILLIAM ALFRED SUTHERLAND.

References Cited in the file of this patent

UNITED STATES PATENTS

| Number | Name | Date |
| --- | --- | --- |
| 2,505,836 | Robbins | May 2, 1950 |

FOREIGN PATENTS

| Number | Country | Date |
| --- | --- | --- |
| 151,419 | Great Britain | Sept. 30, 1920 |
| 114,081 | Sweden | May 22, 1945 |